United States Patent
Fan et al.

(10) Patent No.: US 6,785,383 B2
(45) Date of Patent: Aug. 31, 2004

(54) TELEPHONE LINE SWITCH USING AN OPTOCOOUPLER

(75) Inventors: Yuan-Neng Fan, Scottsdale, AZ (US); Shih-Ming Tung, Taipei Hsian (TW)

(73) Assignee: Fans Telecom, Inc., Scottsdale, AZ (US)

( * ) Notice: Subject to any disclaimer, the term of this patent is extended or adjusted under 35 U.S.C. 154(b) by 562 days.

(21) Appl. No.: 09/798,384

(22) Filed: Mar. 5, 2001

(65) Prior Publication Data

US 2002/0122551 A1 Sep. 5, 2002

(51) Int. Cl.$^7$ ................................................ H04O 9/00
(52) U.S. Cl. ............... 379/393; 379/93.09; 379/413.04; 379/412; 379/399.01; 379/162
(58) Field of Search ............................. 379/93.09, 162, 379/379, 393, 399, 412, 413.04

(56) References Cited

U.S. PATENT DOCUMENTS 5,692,041 A * 11/1997 Torazzina ................... 379/379

* cited by examiner

Primary Examiner—Curtis Kuntz
Assistant Examiner—Alexander Jamal
(74) Attorney, Agent, or Firm—Jeffrey D. Moy; Harry M. Weiss; Weiss, Moy & Harris, P.C.

(57) ABSTRACT

A telephone line connection and disconnection circuit has a diode bridge coupled to the telephone line which converts different voltages of the telephone line into a voltage referenced to ground. A switching circuit is coupled to the diode bridge which opens and closes a conductive pathway for connecting and disconnecting a telephony product from the telephone line. A resistive element is coupled to the diode bridge and the switching circuit which allows for the conductive pathway to be normally closed. An optical isolator is coupled to the switching circuit and the resistive element for sending a control signal to the circuit when required.

12 Claims, 1 Drawing Sheet

TELEPHONE LINE SWITCH USING AN OPTOCOOUPLER

BACKGROUND OF THE INVENTION

1. Field of the Invention

This invention relates to telephony products and, more specifically, to a telephone line connection and disconnection circuit which does not require the use of a relay. By eliminating the need for a relay, the telephone line connection and disconnection circuit will consume less power and be less expensive to produce.

2. Description of the Prior Art

Many telephone adjunct boxes are required to disconnect the associate telephone from the telephone line. The reason for requiring the disconnection of the telephone from the telephone line is to suppress the telephone ringing and to mute the telephone conversation during a call. It is also the best way to check if another extension is in the off-hook condition. Presently, all devices which connect or disconnect the associate telephone from the telephone adjunct box use some type of relay for switching.

While relays do work, there are several problems associated with there use. First, mechanical relays are very large and bulky. Thus, the circuits that are used to connect and disconnect the associate telephone from the telephone adjunct box tend to be large and bulky. Furthermore, mechanical relays consume more power than other types of switches. While there are other types of relays which are smaller in size, such as solid state relays, solid state relays are more expensive to build and implement thus driving up the cost of the circuit used to connect and/or disconnect the associate telephone from the telephone adjunct box. Another problem with using relays is the noise that these types of devices create. Generally, when switching a relay from one position to another, there is noise that is generated. The noise will generally be a clicking sound when the relay changes position. While the noise generally will not interfere with the operation of the circuitry, it's very annoying to the end user.

Therefore, a need existed to provide an improved circuit for connecting and disconnecting an associate telephone from a telephone adjunct box. The improved circuit must reduce the size of present circuits which use mechanical relays. The improved circuit must also reduce the amount of power consumed by present circuits which use mechanical relays. The improved circuit must further eliminate the noise involved when connecting and disconnecting the associate telephone from a telephone adjunct box. Finally, the improved circuit must be fairly inexpensive to build and operate.

SUMMARY OF THE INVENTION

In accordance with one embodiment of the present invention, it is an object of the present invention to provide an improved circuit for connecting and/or disconnecting an associate telephone from a telephone adjunct box.

It is another object of the present invention to provide an improved circuit for connecting and/or disconnecting an associate telephone from a telephone adjunct box that reduces the size of present circuits which use mechanical relays.

It is still another object of the present invention to provide an improved circuit for connecting and/or disconnecting an associate telephone from a telephone adjunct box that reduces the amount of power consumed by present circuits which use mechanical relays.

It is yet another object of the present invention to provide an improved circuit for connecting and/or disconnecting an associate telephone from a telephone adjunct box that eliminates the noise involved when connecting and/or disconnecting the associate telephone from a telephone adjunct box.

It is still a further object of the present invention to provide an improved circuit for connecting and/or disconnecting an associate telephone from a telephone adjunct box that is inexpensive to build and operate.

BRIEF DESCRIPTION OF THE PREFERRED EMBODIMENTS

In accordance with one embodiment of the present invention a telephone line connection and disconnection circuit is disclosed. The circuit has a diode bridge coupled to the telephone line which converts different voltages of the telephone line into a voltage referenced to ground. A switching circuit is coupled to the diode bridge which opens and closes a conductive pathway for connecting and disconnecting a telephony product from the telephone line. A resistive element is coupled to the diode bridge and the switching circuit which allows for the conductive pathway to be normally closed. An optical isolator is coupled to the switching circuit and the resistive element for sending a control signal to the circuit when required.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

Figure 1:
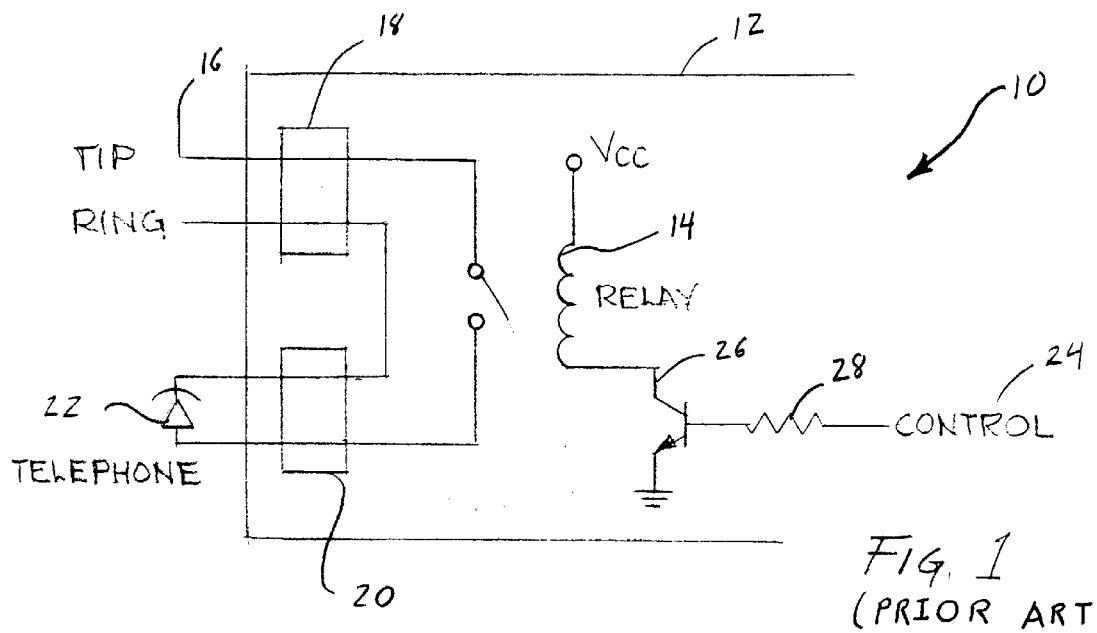
FIG. 1 is a prior art diagram of a circuit used for connecting and disconnecting an associate telephone from a telephone adjunct box.

Referring to FIG. 1, a prior art circuit 10 is shown which is used to connect and disconnect an associate telephone from a telephone adjunct box. The telephone adjunct box is any box between a telephone jack and a corresponding telephone. For example, a caller identification box, a telephone answering machine, and similar apparatus are typical examples of a telephone adjunct box. The telephone adjunct box is used to suppress telephone ringing and/or to mute telephone conversation during a call. It is also used to check if another extension is in the off-hook condition.

The circuit 10 is generally held within the adjunct box 12. The circuit 10 generally uses a relay 14. There are numerous problem with using a relay 14. For example, if the relay 14 is a mechanical relay, the relay 14 will tend to be rather bulky. This will increase the size of the circuit 10 and the adjunct box 12 used to hold the circuit 10. The relay 14 could be a solid state relay which is smaller in size, but solid state relays are more expensive to build and implement thus driving up the cost of the circuit 10. A further problem if the relay 14 is a mechanical relay is that the circuit 10 will consume more power than is desirable. Another problem with using a relay 14 is the noise that the relay 14 generates. If one is on the telephone 22 and the relay 14 switches to disconnect the telephone 22 from the telephone line 16, a loud click noise is heard. While the noise generally will not interfere with the operation of the circuit 10, it's very annoying to the user.

The circuit 10 is coupled to one end of the telephone line 16 via a connector 18. The other end of the telephone line 16 will generally be coupled to a telephone jack (not shown). From the connector 18, the telephone line 16 is coupled to a telephone 22 via a second connector 20. Presently, a relay 14 is used to connect and disconnect the telephone 22 from the adjunct box 12. The relay 14 is controlled by a control signal 24. The control signal 24 is generally generated by a microcontroller (not shown). The control signal 24 is sent to a transistor 26 via a resistor 28. The transistor 26 is used to turn on and turn off the relay 14. By turning on and turning off the relay 14, the relay will connect and disconnect the telephone 22 from the telephone adjunct box 12.

In the embodiment depicted in FIG. 1, if the control signal 24 is high, the transistor 26 is conducting so the relay 14 is active. Conversely, if the control signal 24 is low, the transistor 26 is turned off. Thus, the relay 14 is not active. Generally, the relay 14 is a normally closed relay. Thus, if there is no power to the adjunct box 12, the telephone 22 will still function.

Figure 2:
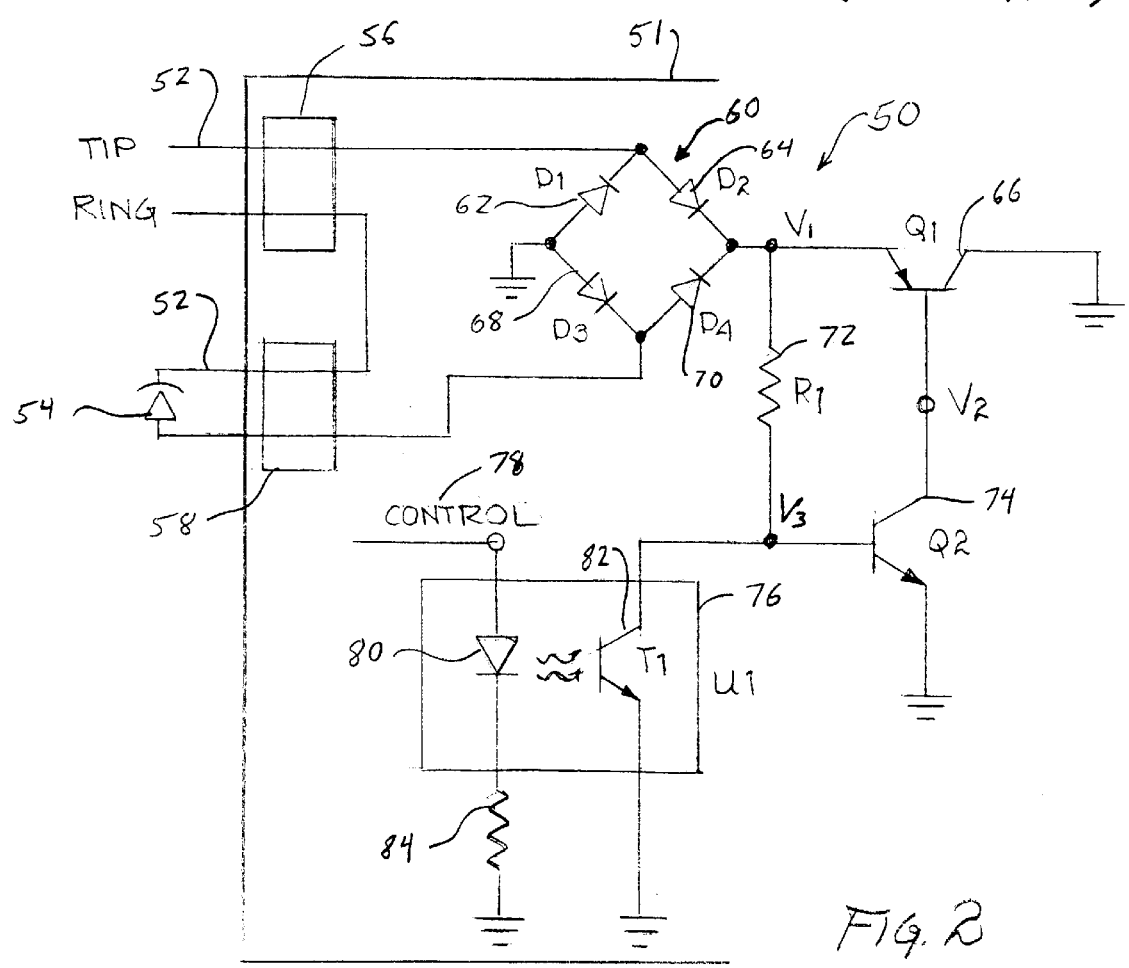
FIG. 2 is a circuit diagram of the present invention which is used for connecting and/or disconnecting an associate telephone from a telephone adjunct box and which uses no relays.

Referring now to FIG. 2, a circuit diagram of the present invention is shown. Like the prior art, the circuit 50 is also used to connect and or disconnect an associate telephone 54 from the telephone adjunct box 51. The circuit 50 removes the relay 14 (FIG. 1) and the problems associated with the use of the relay 14. The circuit 50 uses a diode bridge 60 and a plurality of transistors to connect and/or disconnect the associate telephone 54 from the telephone adjunct box 51.

It should be noted that while the circuit 50 is shown in FIG. 2 to be in the adjunct box 51, the circuit 50 may be installed in other areas and the adjunct box 51 should not be seen as to limit the scope of the present invention. The circuit 50, for example, may be installed inside a telephony product for high voltage line switching.

The circuit 50 is coupled to a telephone line 52 via a connector 56. One section of the telephone line 52 (i.e., the ring) is coupled to the telephone 54 via a connector 58. A second section from the telephone line 52 (i.e., tip) is coupled to a diode bridge 60. The diode bridge 60 is comprised of a plurality of diodes coupled together. In the embodiment depicted in FIG. 2, the diode bridge 60 has a first diode 62 which has a first terminal coupled to the telephone line 52 and a second terminal coupled to ground potential. A second diode 64 has a first terminal coupled to a transistor 66 and a second terminal coupled to the first terminal of the diode 62. A third diode 68 has a first terminal coupled to the telephone line 52 and a second terminal coupled to both the second terminal of the first diode 62 and ground potential. A fourth diode 70 has a first terminal coupled to both the first terminal of the second diode 64 and the transistor 66 and a second terminal coupled to both the first terminal of the third diode 68 and the telephone line 52. The diode bridge 60 converts the different voltage of the telephone line 52 (i.e., on-hook and off-hook conditions) into a voltage at node V1 which is referenced to ground.

The diode bridge 60 is coupled to a resistive element 72 and the transistor 66. The first terminals of the second and fourth diodes 64 and 70 respectively of the diode bridge 60, are coupled to the resistive element 72 and the transistor 66. The transistor 66 has three terminals. The first terminal is coupled to ground potential which is also the same ground potential as the diode bridge 60. The second terminal of the transistor 66 is coupled to a second transistor 74. The third terminal is coupled to the diode bridge 60 and the resistive element 72. In the embodiment depicted in FIG. 2, the transistor 66 is a PNP transistor. The resistor 72 has a first terminal coupled to the second transistor 74 and a second terminal coupled to both the third terminal of the first transistor 66 and the diode bridge 60. The resistor 72 is used to allow the circuit 50 to function as normally closed. This will be explained below in the Operation section.

The second transistor 74 also has three terminals. The first terminal is coupled to the second terminal of the first transistor 66. The third terminal of the second transistor 74 is coupled to ground. The second terminal of the second transistor 74 is coupled to the first terminal of the resistive element 72. The second terminal of the second transistor 74 is also coupled to an optical isolator 76. The transistor 74 is used for control. It allows the control signal 78 to pull more current through. In the embodiment depicted in FIG. 2, the transistor 74 is an NPN transistor.

The optical isolator 76 is used for isolating a control signal 78 from a microcontroller (not shown) from the circuit 50. The optical isolator 76 is comprised of a light emitting diode 80 and a transistor 82. The light emitting diode 80 has a first terminal coupled to a resistor 84 and a second terminal coupled to the control signal 78. The control signal 78 will activate and deactivate the light emitting diode. The transistor 82 has three terminals. The first terminal is coupled to the second terminal of the transistor 74 and to the first terminal of the resistor 72. The second terminal of the transistor 82 is receives a signal from the light emitting diode 80. The third terminal of the transistor 82 is coupled to ground. The ground in which the resistor 84 and the transistor 82 are coupled to are different grounds. The transistor 82 functions like a switch and will activate when the control signal 78 activates the light emitting diode 80.

OPERATION

The circuit 50 operates in the following manner. Generally there is a voltage between the tip and ring of the telephone line 52. For an on-hook state, the voltage between the tip and ring and thus the voltage at node V1 is approximately 48 volts. For an off-hook state, the voltage between the tip and ring and thus the voltage at node V1 is approximately 6 volts.

In the absence of any control signal 78, the transistor 82 will not be active. The impedance between the emitter and collector of the transistor 66 is high. This is because there will be a voltage applied at the node V1 caused by the voltage between the tip and ring of the telephone line 52 which the diode bridge 60 converts into a voltage at node V1 which is referenced to ground. The voltage at node V1 allows the resistor 72 to provide a current to the base of the transistor 74. The current will activate the transistor 74 pulling the voltage at node V2 low to ground. This turns the transistor 66 on thus pulling the voltage at node V1 to ground. Since the transistor 66 and the diode bridge 60 are connected to the same ground potential, a conducting path is formed when the transistor 66 is active. The conducting path allows a signal to flow from the tip of the telephone line 52 through the diode 64 and through the transistor 66 to ground. Since the ground of transistor 66 and the ground of the diode bridge 60 are coupled together, the signal can flow back from ground through the diode 68 of the diode bridge 60 to the associated telephone 54 to the ring of the telephone line 52.

When the control signal 78 is active, the light emitting diode 80 will generate a light signal which will activate the transistor 82. This will cause the voltage at node V3 to be pulled towards ground, thus turning off the transistor 74. If the transistor 74 is turned off, the transistor 66 is also turned off. The associated telephone set 54 is thus disconnected from the telephone line 52.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A telephone line connection and disconnection circuit comprising, in combination:
    a diode bridge coupled to the telephone line which converts different voltages of the telephone line into a voltage referenced to ground;
    a switching circuit coupled to the diode bridge which opens and closes a conductive pathway for connecting and disconnecting a telephone product from the telephone line; and
    a resistive element coupled to the diode bridge and the switching circuit which allows for the conductive pathway to be normally closed;
    wherein the switching circuit comprises:
        a first transistor having three terminal wherein a first terminal is coupled to the round and a third terminal is coupled to the diode bridge and the resistive element; and
        a second transistor having three terminals wherein a first terminal is coupled to a second terminal of the first transistor a second terminal coupled to the resistive element and to the optical isolator and a third terminal coupled to round wherein the second transistor is an NPN transistor.

2. A telephone line connection and disconnection circuit in accordance with claim 1 further comprising an optical isolator coupled to the switching circuit and the resistive element for sending a control signal to the circuit when required.

3. A telephone line connection and disconnection circuit in accordance with claim 1 wherein the diode bridge comprises:
    a first diode having a first terminal coupled to the telephone line and a second terminal coupled to ground;
    a second diode having a first terminal coupled to the switching circuit and the resistive element and a second terminal coupled to the first terminal of the first diode;
    a third diode having a first terminal coupled to the telephone line and a second terminal coupled to the ground; and
    a fourth diode having a first terminal coupled to the first terminal of the second diode, to the switching circuit and to the resistive element and a second terminal coupled to the first terminal of the third diode and to the telephone line.

4. A telephone line connection and disconnection circuit in accordance with claim 1 wherein the first transistor is a PNP transistor.

5. A telephone line connection and disconnection circuit in accordance with claim 1 wherein the optical isolator comprises:
    a light emitting diode for generating a signal to activate and deactivate the circuit; and
    a switch coupled to the light emitting diode for sending a signal which activates and deactivates the circuit.

6. A telephone line connection and disconnection circuit in accordance with claim 5 wherein the light emitting diode is coupled to a control signal which activates the light emitting diode so the light emitting diode generates a signal to activate and deactivate the circuit.

7. A telephone line connection and disconnection circuit comprising, in combination:
    a diode bridge coupled to the telephone line which converts different voltages of the telephone line into a voltage referenced to ground;
    a pair of transistors coupled to the diode bridge which opens and closes a conductive pathway for connecting and disconnecting a telephony product from the telephone line; and
    a resistive element coupled to the diode bridge and the switching circuit which allows for the conductive pathway to be normally closed;
    wherein the pair of transistors comprises:
        a first transistor coupled to the round and to the diode bridge and the resistive element; and
        a second transistor coupled to the first transistor to the resistive element to the optical isolator and to round wherein the second transistor is an NPN transistor.

8. A telephone line connection and disconnection circuit in accordance with claim 7 further comprising an optical isolator coupled to the switching circuit and the resistive element for sending a control signal to the circuit when required.

9. A telephone line connection and disconnection circuit in accordance with claim 7 wherein the diode bridge comprises:
    a first diode coupled to the telephone line and to ground;
    a second diode coupled to the switching circuit, the resistive element and to the first diode;
    a third diode coupled to the telephone line and to the ground; and
    a fourth diode coupled to the second diode, to the switching circuit, to the resistive element, to the third diode and to the telephone line.

10. A telephone line connection and disconnection circuit in accordance with claim 7 wherein the first transistor is a PNP transistor.

11. A telephone line connection and disconnection circuit in accordance with claim 7 wherein the optical isolator comprises:
    a light emitting diode for generating a signal to activate and deactivate the circuit; and
    a switch coupled to the light emitting diode for sending a signal which activates and deactivates the circuit.

12. A telephone line connection and disconnection circuit in accordance with claim 11 wherein the light emitting diode is coupled to a control signal which activates the light emitting diode so the light emitting diode generates a signal to activate and deactivate the circuit.

* * * * *